United States Patent [19]

Krounbi et al.

[11] Patent Number: 5,018,037
[45] Date of Patent: May 21, 1991

[54] MAGNETORESISTIVE READ TRANSDUCER HAVING HARD MAGNETIC BIAS

[76] Inventors: Mohamad T. Krounbi, 6238 Paso Los Cerritos, San Jose, Calif. 95120; Otto Voegeli, 13465 Sycamore Ave., Morgan Hill, Calif. 95037; Po-Kang Wang, 1007 Shadow Brook Dr., San Jose, Calif. 95120

[21] Appl. No.: 419,246

[22] Filed: Oct. 10, 1989

[51] Int. Cl.$^5$ .............................................. G11B 5/39
[52] U.S. Cl. .................................................. 360/113
[58] Field of Search ........................ 360/113; 324/252; 338/32 R

[56] References Cited

U.S. PATENT DOCUMENTS

| | | | |
|---|---|---|---|
| 3,840,898 | 10/1974 | Bajorek et al. | 360/113 |
| 4,024,489 | 5/1977 | Bajorek et al. | 338/32 R |
| 4,639,806 | 1/1987 | Kira et al. | 360/113 |
| 4,663,685 | 5/1987 | Tsang | 360/113 |
| 4,771,349 | 9/1988 | Tsang | 360/113 |
| 4,782,414 | 11/1988 | Krounbi et al. | 360/113 |
| 4,803,580 | 2/1989 | Mowry | 360/113 |

Primary Examiner—Robert S. Tupper
Attorney, Agent, or Firm—Otto Schmid, Jr.

[57] ABSTRACT

A magnetoresistive (MR) read transducer having passive end regions separated by a central active region in which an MR layer is formed which extends over substantially only the central active region and in which a hard magnetic layer is formed in each end region. The hard magnetic layers form an abutting junction having electrical and magnetic continuity with the MR layer to produce a longitudinal bias in the MR sensor. The transducer is produced by a method in which the same stencil defines the extent of both the MR layer and the hard magnetic layers so that the abutting junctions are formed easily and reliably.

6 Claims, 2 Drawing Sheets

MAGNETORESISTIVE READ TRANSDUCER HAVING HARD MAGNETIC BIAS

BACKGROUND OF THE INVENTION

This invention relates to thin film magnetic heads, and, more particularly to a magnetic head having a magnetoresistive read transducer.

The use of a magnetoresistive (MR) sensor to sense magnetically recorded data has been known for many years. It has also been known that both longitudinal and transverse bias must be provided to eliminate Barkhausen noise and to maintain the sensor in its most linear operating range. Commonly assigned U.S. Pat. No. 4,024,489 describes an MR sensor in which a hard magnetic bias layer is used. In this sensor both the MR layer and the hard magnetic bias layer extend across the entire sensor to produce a transverse bias.

Commonly assigned U.S. Pat. No. 3,840,898 discloses an MR sensor in which a transverse bias is produced. In the embodiment shown in FIGS. 4 and 5 a magnetoresistive stripe such as NiFe is treated in edge regions to produce a hard magnetic state. However the edge regions are arranged parallel to the direction of sense current and run along the entire stripe to produce a transverse bias and would not produce longitudinal bias.

It has become increasingly difficult to produce MR read transducers in the small size needed to read the data recorded on ever decreasing track widths at ever increasing recording density. One solution proposed to meet these requirements is described in commonly assigned U.S. Pat. No. 4,663,685 in which transverse bias is produced in only a central active region of the sensor and longitudinal bias is produced in the inactive end regions by means of exchange coupling between the part of the ferromagnetic MR layer which extends into the end regions and antiferromagnetic layers which extend over only the end region. U.S. Pat. No. 4,639,806 shows an MR sensor which has longitudinal bias produced by exchange coupling between the MR layer and hard magnetic layers in the end regions only.

These sensors have been shown to meet the present requirements. However, to meet future design requirements, the dimensional accuracy required severely limits the ability to build these structures in processes that are both economical and sufficiently accurate.

None of the known prior art references disclose an MR sensor in which the MR layer extends over substantially only the central active region and a hard magnetic bias layer is provided in each end region which forms an abutting junction with the MR layer to produce longitudinal bias in the MR sensor.

SUMMARY OF THE INVENTION

It is therefore the principal object of this invention to provide a magnetoresistive (MR) read transducer in which the MR layer extends over substantially only the central active region and a hard magnetic bias layer is provided in each end region which forms an abutting junction with the MR layer to produce a longitudinal bias in the MR sensor.

In accordance with the present invention, the MR read transducer comprises an MR sensor having passive end regions separated by a central active region. A thin MR layer of ferromagnetic is formed which extends over substantially only the central active region. A first and second film of hard magnetic material is formed extending over substantially only one of the passive end regions and forming an abutting junction having electrical and magnetic continuity with one end of the MR layer to produce a longitudinal bias in the MR sensor.

The preferred method for making the MR read transducer comprises the steps of depositing a thin MR layer of ferromagnetic material over at least the central active region of the transducer, producing a stencil covering the central active region of the transducer, and etching away the part of the MR material not covered by the stencil. A film of hard magnetic material is then deposited over regions of the transducer not covered by the stencil to produce the passive end regions of the transducer with the hard magnetic material forming an abutting junction with one end of the Mr material so that a longitudinal bias is produced in each of the passive end regions of the transducer.

The foregoing and other objects, features and advantages of the invention will be apparent from the following more particular description of a preferred embodiment of the invention as illustrated in the accompanying drawings.

DESCRIPTION OF THE PREFERRED EMBODIMENT

Figure 1:
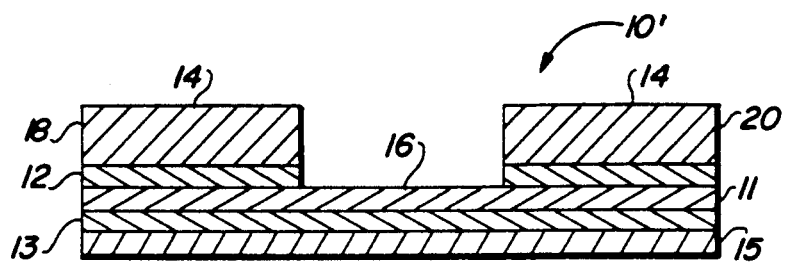
FIG. 1 is an end view of a prior art MR read transducer in which longitudinal bias is provided in the end regions only of the MR read transducer.

As shown in FIG. 1 of the drawings, a prior art MR read transducer of the type described and claimed in commonly assigned U.S. Pat. No. 4,663,685 comprises an MR layer 11 which extends over the entire transducer 10'. An exchange bias layer 12 extends over the end regions 14 only to produce a longitudinal bias field and a soft magnetic film layer 15, separated from the MR layer 11 by a thin non-magnetic spacer layer 13, produces a transverse bias field in at least part of the central active region 16. The read signal is sensed over the central active region 16 which is defined in this embodiment by the spacing between conductors 18 and 20.

Figure 2:
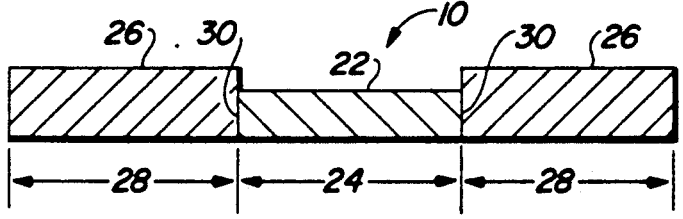
FIG. 2 is a conceptual end view of an MR read transducer embodying the present invention.
Figure 3A:
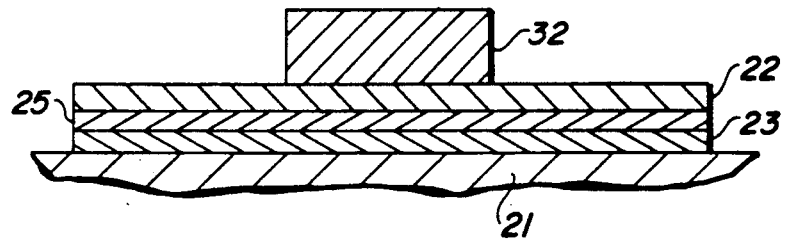
FIG. 3 a-d is a diagram showing a specific embodiment of a process for fabricating a contiguous junction according to the present invention.
Figure 3B:
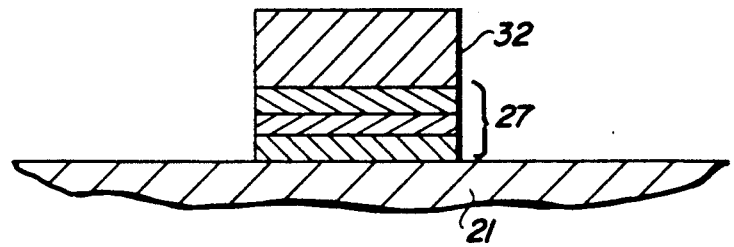
Figure 3C:
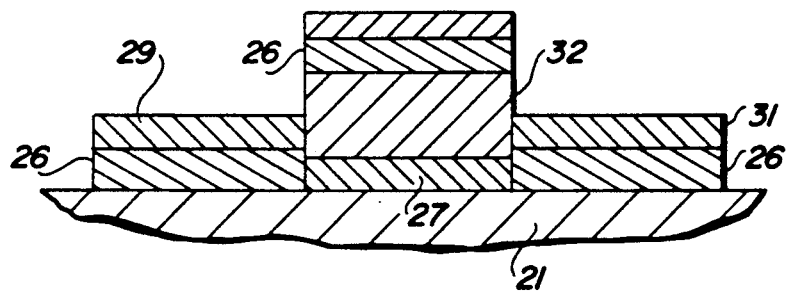
Figure 3D:
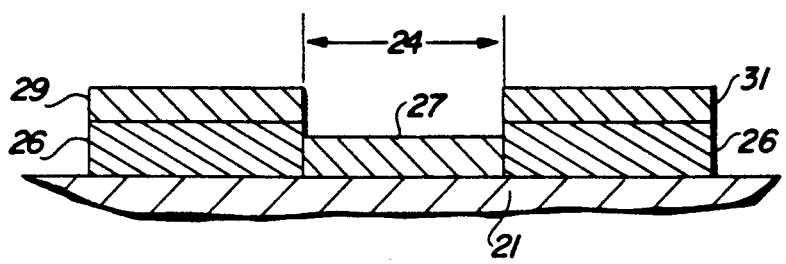

A conceptual view of an MR read transducer according to the present invention is shown in FIG. 2. The MR read transducer comprises an MR layer 22 which extends over substantially only the central active region 24 and a hard magnetic bias layer 26 in each end region 28 which forms an abutting junction 30 with the MR layer 22 to produce longitudinal bias in the MR read transducer 10. This embodiment does not require additional side-reading suppression components. Instead, the hard magnetic bias layer 26 in each end region 28 need only provide for electrical and magnetic continuity to the MR layer 22. The hard magnetic bias layer 26 can be provided with a single layer of metallurgy such as Co Cr, Co Pt or Co Cr Pt, for example, although the use of under-and/or overcoats such as W or Au may be desirable. The thickness of a hard magnetic layer is chosen so as to provide the desired amount of bias flux. As known to those skilled in the art, transverse bias is also required in the central active region 24, and this bias can be provided by soft film bias, shunt bias, barber pole bias configuration, or any other compatible transverse bias techniques. However, the transverse bias structure has not been shown in the conceptual view of FIG. 2.

A specific embodiment of a process for fabricating a suitable junction between the MR layer 22 and the hard magnetic bias layer 26 is shown in FIG. 3 a–d. The process comprises the steps of depositing, upon a suitable substrate 21 a film of MR material such as NiFe, for example, over the length of the sensor. In the embodiment shown, a transverse bias structure comprising a soft magnetic film 23 and non-magnetic spacer layer 25 are deposited on substrate 21 prior to deposition of the MR layer 22. The process then continues by depositing a film of a suitable material such as photoresist, and patterning the photoresist material to form a stencil 32 (FIG. 3a). Stencil 32 is used to define each edge of the MR layer 22 as the film of MR material 22 as well as the spacer layer 25 and the soft magnetic film 23 are subjected to a subtractive process such as sputter etching, ion milling or chemical etching to produce an MR trilayer structure 27 (FIG. 3b). The material for the hard magnetic bias layers 26 is then deposited as stencil 32 again defines edges of the bias layers 26 (FIG. 3c). Using the same stencil 32, a conductor layer is deposited to produce conductor leads 29 and 31. If desired, conductor leads 29 and 31 can be deposited in a later step if the conductor leads 29 and 31 are not coextensive with the hard bias layer 26. Note that a quantity of hard magnetic material and conductive material is also deposited on top of stencil 32. However this quantity of material is removed, along with stencil 32 in a lift-off process (FIG. 3d) to produce a sensor having hard magnetic bias layers 26 in the end regions only, each having a contiguous junction with the MR trilayer structure 27 which extends over only the central active region 24.

Although a square butted junction between the MR layer 22 and the hard magnetic bias layer 26 is shown conceptually in FIGS. 2 and 3, the preferred embodiment comprises a junction in which the topography is well controllable so that the junction can be produced easily and reliably.

Figure 4:
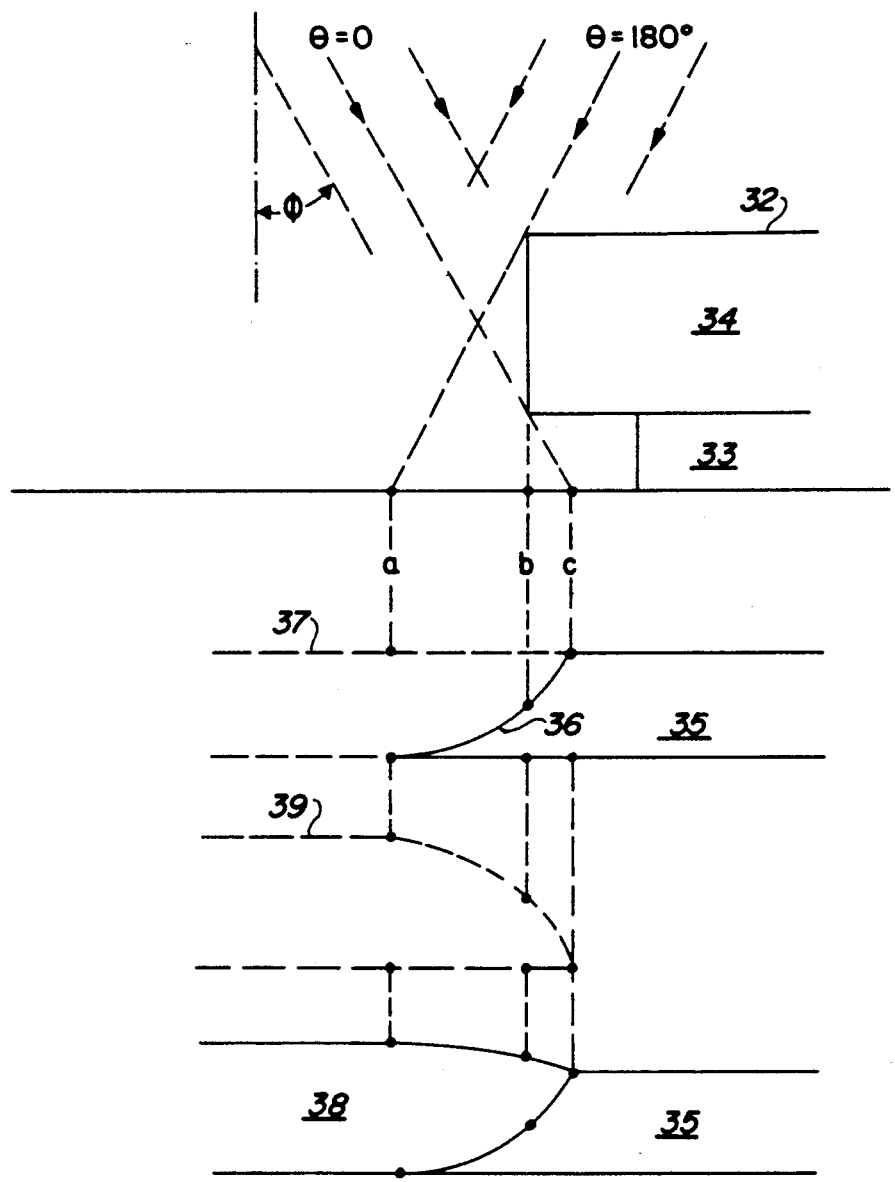
FIG. 4 is an exploded diagram showing in greater detail the formation of the contiguous junction according to a specific embodiment of the present invention.

FIG. 4 shows in greater detail the formation of the contiguous junction according to an embodiment of the present invention. In this case the stencil 32 comprises a bi-layer resist formed by a thin underlayer 33 and a thick imaging layer 34. One exposure and one develop step defines the edge profile of the resist. An undercut is created by dissolution of the underlayer 33 in a suitable developer with the undercut distance determined by the develop time.

The unmasked areas of the layer of MR material 35 are then removed by the use of a unidirectional process such as ion milling, for example. The angle of incidence Φ is controlled by suitably tilting the substrate relative to the incident beam. In addition, circular symmetry is obtained by rotating the substrate so that any given point sees the incident beam rotate conically about the azimuth angle θ except near the stencil 32 whose edge shadows the film 35 during some segment of substrate revolution. As shown in FIG. 4, for an azimuth angle of 0 degrees, there is exposure of the film 35 to point C and the exposure limit point moves progressively to the left until at an azimuth angle of 180 degrees the exposure limit point is moved to point a. The combined milling for this embodiment produces a curved taper 36 as a result of the removal during the milling process of the part 37 of the film shown in dashed lines.

The hard magnetic bias layer 38 is then deposited, by sputtering, for example, during a similar orientation and rotation of the substrate to produce a deposition profile such as that shown in dashed lines 39. The combined junction profile resulting from the deposition of bias layer 38 is shown in full line. Although the layer of MR material 35 is shown as a single layer in FIG. 4, it will be recognized that the MR element may comprise other layers, such as transverse bias layers, for example.

This junction profile comprises two overlapping tapers. The taper profile is determined by the height of the stencil 32 and the selected angle of incidence Φ. In a specific embodiment the stencil thickness was about 1 μm and the angle of incidence Φ was in the rang of 70 to 80 degrees. This selected combination produced a taper length of about five times the thickness of the sensor. For electrical reliability the junction should be long, however, for magnetic reliability the junction should be short. For a particular application, junction lengths within the range of 3 to 5 times the sensor thickness were shown to be suitable.

Figure 5:
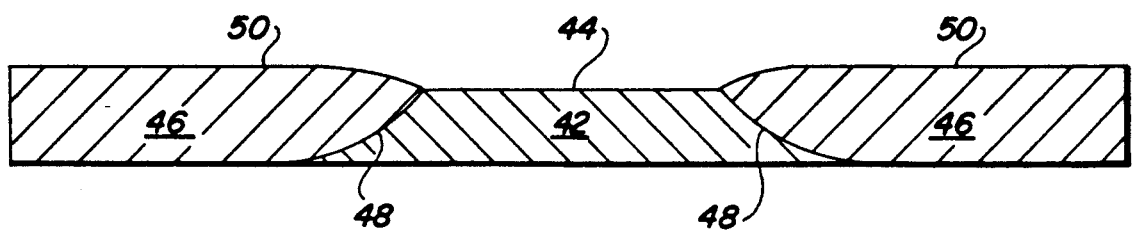
FIG. 5 is an end view of a specific embodiment of an MR read transducer produced in accordance with the process illustrated in FIGS. 3 and 4.

The magnetoresistive read transducer made by the above-described method is shown in FIG. 5 which shows the edge view of the sensor, i.e., the surface which is in close proximity to the magnetic recording medium from which previously recorded magnetic data is to be read. The transducer comprises an MR element 42 which extends over the central active region 44 of the transducer, and hard magnetic bias layers 46 which form an abutting junction 48 with the MR element 42. The hard magnetic bias layers 46 extend over the end regions 50 of the transducer so that a longitudinal bias can be produced in the end regions 50 only of the transducer.

While the invention has been particularly shown and described with reference to a preferred embodiment thereof, it will be understood by those skilled in the art that various other changes in the form and details may be made therein without departing from the spirit and scope of the invention.

Having thus described our invention, what we claim as new, and desire to secure by Letters Patent is:

1. A magnetoresistive read transducer comprising;
   a magnetoresistive sensor having passive end regions separated by a central active region;
   a thin film of magnetoresistive conductive layer formed of magnetic material, said magnetoresistive conductive layer extending over substantially only said central active
   a first and a second thin film of hard magnetic material, each of said thin film of hard magnetic material forming an abutting junction having electrical and magnetic continuity with one end of said magnetoresistive conductive layer, each of said thin film of hard magnetic material extending over substantially only one of said passive end regions to produce a longitudinal bias in said magnetoresistive sensor.

2. The magnetoresistive read transducer of claim 1 wherein said abutting junction comprises two overlapping tapers.

3. The magnetoresistive read transducer of claim 2 wherein said overlapping tapers comprise a continuous curved surface.

4. The magnetoresistive read transducer of claim 1 wherein said abutting junction has a length between 3 and 5 times the thickness of said magnetoresistive layer.

5. The magnetoresistive read transducer of claim 1 additionally comprising means for producing a transverse bias in at least a part of said central active region.

6. The magnetoresistive read transducer of claim 5 wherein said means for producing a transverse bias comprises a soft magnetic film spaced from said magnetoresistive layer.

* * * * *

UNITED STATES PATENT AND TRADEMARK OFFICE
CERTIFICATE OF CORRECTION

PATENT NO.  : 5,018,037
DATED       : May 21, 1991
INVENTOR(S) : M. T. Krounbi, et al.

It is certified that error appears in the above-identified patent and that said Letters Patent is hereby corrected as shown below:

Column 3, Line 66, delete "5". Then, "JOIN" line 66 with line 65 after --obtained--.

IN THE CLAIMS

CLAIM 1, Column 4, Line 58, after "active" insert --region; and--.

Signed and Sealed this

Twenty-second Day of June, 1993

Attest:

MICHAEL K. KIRK

Attesting Officer

Acting Commissioner of Patents and Trademarks

UNITED STATES PATENT AND TRADEMARK OFFICE
CERTIFICATE OF CORRECTION

PATENT NO. : 5,018,037
DATED : May 21, 1991
INVENTOR(S) : M. T. Krounbi, et al.

It is certified that error appears in the above-identified patent and that said Letters Patent is hereby corrected as shown below:

On the Title page, item [75] please add assignee as follows:

Assignee: International Business Machines
                Corporation, Armonk, N.Y.

Signed and Sealed this

Twenty-eighth Day of September, 1993

*Attest:*

BRUCE LEHMAN

*Attesting Officer*     *Commissioner of Patents and Trademarks*